(12) United States Patent
Dang et al.

(10) Patent No.: US 10,908,684 B2
(45) Date of Patent: Feb. 2, 2021

(54) 3D DISPLAY METHOD AND USER TERMINAL

(71) Applicant: Huawei Technologies Co., Ltd., Shenzhen (CN)

(72) Inventors: Maochang Dang, Shanghai (CN); Yi Li, Xi'an (CN); Guanglin Wang, Shanghai (CN); Yuxiang Fu, Shenzhen (CN); Mingliang Du, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/338,216

(22) PCT Filed: Sep. 30, 2016

(86) PCT No.: PCT/CN2016/101374
§ 371 (c)(1),
(2) Date: Mar. 29, 2019

(87) PCT Pub. No.: WO2018/058673
PCT Pub. Date: Apr. 5, 2018

(65) Prior Publication Data
US 2019/0391639 A1 Dec. 26, 2019

(51) Int. Cl.
G06F 3/01 (2006.01)
G06T 15/20 (2011.01)
G09G 5/397 (2006.01)

(52) U.S. Cl.
CPC .............. *G06F 3/013* (2013.01); *G06T 15/20* (2013.01); *G09G 5/397* (2013.01)

(58) Field of Classification Search
None
See application file for complete search history.

(56) References Cited

U.S. PATENT DOCUMENTS

| 8,902,299 | B2 | 12/2014 | Tsai et al. | |
| 2009/0282429 | A1* | 11/2009 | Olsson | H04N 13/376 725/10 |
| 2010/0123772 | A1* | 5/2010 | Kawakami | G06F 3/012 348/51 |
| 2011/0083103 | A1 | 4/2011 | Shim et al. | |
| 2012/0236118 | A1 | 9/2012 | Tsai et al. | |
| 2015/0062311 | A1 | 3/2015 | Malzbender | |
| 2015/0271567 | A1 | 9/2015 | Michot et al. | |
| 2016/0227204 | A1 | 8/2016 | Lin | |
| 2017/0054972 | A1 | 2/2017 | Wang | |

FOREIGN PATENT DOCUMENTS

| CN | 102611909 A | 7/2012 |
| CN | 103000161 A | 3/2013 |
| CN | 103354616 A | 10/2013 |
| CN | 103517060 A | 1/2014 |
| CN | 104503092 A | 4/2015 |

(Continued)

*Primary Examiner* — Said Broome
(74) *Attorney, Agent, or Firm* — Slater Matsil, LLP

(57) ABSTRACT

A three-dimensional (3D) display method and system for #D display, the method including detecting a viewing angle of a user for a display screen, determining an angle of 3D projection based on the viewing angle, and performing, based on the angle of 3D projection, 3D display of content that needs to be displayed.

18 Claims, 7 Drawing Sheets

(56) References Cited

FOREIGN PATENT DOCUMENTS

| | | |
|---|---|---|
| CN | 104581113 A | 4/2015 |
| CN | 104581350 A | 4/2015 |
| CN | 104601981 A | 5/2015 |
| CN | 104618711 A | 5/2015 |
| CN | 105120251 A | 12/2015 |
| EP | 2747430 A2 | 6/2014 |
| EP | 2976881 B1 | 9/2018 |
| TW | 201240434 A | 10/2012 |

* cited by examiner

3D DISPLAY METHOD AND USER TERMINAL

CROSS REFERENCE TO RELATED APPLICATIONS

This application is a National Stage of International Application No. PCT/CN2016/101374, filed Sep. 30, 2016, which is hereby incorporated by reference in its entirety.

TECHNICAL FIELD

The present invention relates to the field of terminal technologies, and in particular, to a 3D display method and a user terminal.

BACKGROUND

A three-dimensional (3D) display technology can make an output image become stereoscopic and vivid, so that a viewer has a feeling of being personally on a scene. Currently, the 3D display technology is widely applied to user terminals (terminals such as a mobile phone, a computer, and a television).

However, it is found in practice currently that a user needs to view content of 3D display from a fixed angle to have optimal 3D experience. That is, 3D display of a user terminal cannot flexibly adapt to different viewing locations or viewing angles of a user. The 3D display technology needs to be further improved.

SUMMARY OF THE INVENTION

Embodiments of the present invention disclose a 3D display method and a user terminal, to dynamically adjust an angle of 3D projection (3D Project Angle) based on a viewing angle of a user, to resolve a problem of being incapable of flexibly adapting to different viewing locations or viewing angles of the user when 3D display is performed at a fixed angle of 3D projection.

According to a first aspect, a 3D display method is provided and is applied to a user terminal. The method includes detecting, by the user terminal, a viewing angle of a user for a display screen, determining, by the user terminal, an angle of 3D projection based on the viewing angle, and performing, by the user terminal based on the angle of 3D projection, 3D display on content that needs to be displayed.

In an optional implementation, the viewing angle may be a medial-axis angle of view, the medial-axis angle of view is an angle between a midpoint of both eyes and a central vertical line, and the central vertical line is a line perpendicular to a central location on the display screen.

In an optional implementation, the viewing angle may include a left-eye angle of view and a right-eye angle of view, the left-eye angle of view is an angle between a midpoint of a left-eye pupil and a central vertical line, the right-eye angle of view is an angle between a midpoint of a right-eye pupil and the central vertical line, and the central vertical line is a line perpendicular to a central location on the display screen.

It can be learned that by means of implementing the method according to the first aspect, the user terminal can dynamically adjust the angle of 3D projection for 3D display based on the viewing angle of the user. This can flexibly adapt to different viewing locations or viewing angles of the user, making a 3D display effect vivider and a 3D image viewed by the user clearer, thereby improving the 3D display effect.

In an optional implementation, when the viewing angle detected by the user terminal is a medial-axis angle of view, the detecting, by the user terminal, a viewing angle of a user for a display screen may include detecting, by the user terminal, an angle of inclination of the user terminal relative to a plumb line, an angle of rotation at which the user terminal rotates around an axis of symmetry, and an angle between the midpoint of both eyes and a camera, and performing, by the user terminal, calculation based on the angle of inclination, the angle of rotation, and the angle between the midpoint of both eyes and the camera, to obtain the medial-axis angle of view.

By means of implementing this implementation, the user terminal can accurately determine the medial-axis angle of view.

In an optional implementation, the user terminal may detect in real time the angle of inclination of the user terminal relative to the plumb line, the angle of rotation at which the user terminal rotates around the axis of symmetry, and the angle between the midpoint of both eyes and the camera. In this way, after the viewing angle of the user changes, the user terminal can detect a new medial-axis angle of view of the user in a timely manner, and further, adjust the angle of 3D projection based on the new medial-axis angle of view in a timely manner.

In an optional implementation, the detecting, by the user terminal, an angle of inclination of the user terminal relative to a plumb line, an angle of rotation at which the user terminal rotates around an axis of symmetry, and an angle between the midpoint of both eyes and a camera may include detecting, by the user terminal, the angle of inclination of the user terminal relative to the plumb line, and the angle of rotation at which the user terminal rotates around the axis of symmetry, and detecting the angle between the midpoint of both eyes and the camera when the user terminal detects that a change in the angle of inclination or the angle of rotation is greater than a preset angle. In this way, during 3D display, the camera may not need to remain enabled to take photographs of the user to calculate the angle between the midpoint of both eyes of the user and the camera, thereby helping save a CPU resource.

Optionally, a specific implementation of detecting, by the user terminal, whether a change in the angle of inclination or the angle of rotation is greater than a preset angle may be determining, by the user terminal, whether an absolute value of a difference between a most recently detected angle of inclination and a first angle of inclination exceeds the preset angle, where the first angle of inclination is an angle of inclination that is detected when the angle between the midpoint of both eyes of the user and the camera is detected last time, or determining, by the user terminal, whether an absolute value of a difference between a most recently detected angle of rotation and a first angle of rotation exceeds the preset angle, where the first angle of rotation is an angle of rotation that is detected when the angle between the midpoint of both eyes of the user and the camera is detected last time.

In an optional implementation, the user terminal may specifically perform calculation according to the following formula 1 to obtain the medial-axis angle of view. Formula 1: $\theta = \sqrt{\alpha^2 + \beta^2} + \lambda$. $\theta$ is the medial-axis angle of view. $\alpha$ is the angle of inclination of the user terminal relative to the plumb line. $\beta$ is the angle of rotation at which the user terminal rotates around the axis of symmetry. x is a correction parameter of the preset angle. λ is the angle between the midpoint of both eyes and the camera.

By means of the formula 1, the user terminal can accurately determine the medial-axis angle of view.

In an optional implementation, the user terminal may specifically perform calculation according to the following formula 2 to obtain the medial-axis angle of view. Formula 2: $\theta = \sqrt{(\alpha-\varepsilon)^2 + \beta^2} + x*\lambda$. θ is the medial-axis angle of view. α is the angle of inclination of the user terminal relative to the plumb line. β is the angle of rotation at which the user terminal rotates around the axis of symmetry. x is a correction parameter of the preset angle. λ is the angle between the midpoint of both eyes and the camera. ε is a preset angle value, or may be an empirical value. For example, ε may be 45° or 40°.

By means of the formula 2, the user terminal can accurately determine the medial-axis angle of view.

In an optional implementation, the angle of 3D projection includes a left-eye angle of 3D projection and a right-eye angle of 3D projection, and the determining, by the user terminal, an angle of 3D projection based on the viewing angle may include determining, by the user terminal, the left-eye angle of 3D projection based on the detected medial-axis angle of view and a preset left-eye angle of adjustment, and determining, by the user terminal, the right-eye angle of 3D projection based on the detected medial-axis angle of view and a preset right-eye angle of adjustment.

By means of implementing this implementation, the user terminal can accurately determine the left-eye angle of 3D projection and the right-eye angle of 3D projection.

In an optional implementation, the preset left-eye angle of adjustment is a preset left-eye angle of adjustment that corresponds to the medial-axis angle of view detected by the user terminal and that is in a prestored correspondence between a preset medial-axis angle of view and a preset left-eye angle of adjustment, and the preset right-eye angle of adjustment is a preset right-eye angle of adjustment that corresponds to the medial-axis angle of view detected by the user terminal and that is in a prestored correspondence between a preset medial-axis angle of view and a preset right-eye angle of adjustment.

In this way, a plurality of groups of preset left-eye angles of adjustment and preset right-eye angles of adjustment are stored, and a corresponding preset left-eye angle of adjustment and a corresponding preset right-eye angle of adjustment are obtained based on a currently detected medial-axis angle of view, so that a more accurate preset left-eye angle of adjustment and a more accurate preset right-eye angle of adjustment can be obtained, and the left-eye angle of 3D projection and the right-eye angle of 3D projection can be more accurately obtained.

In an optional implementation, the angle of 3D projection includes a left-eye angle of 3D projection and a right-eye angle of 3D projection, and when the viewing angle includes a left-eye angle of view and a right-eye angle of view, the determining, by the user terminal, an angle of 3D projection based on the viewing angle may include determining, by the user terminal, the left-eye angle of view as the left-eye angle of 3D projection, and determining the right-eye angle of view as the right-eye angle of 3D projection.

In this way, the left-eye angle of 3D projection and the right-eye angle of 3D projection can be accurately determined.

In an optional implementation, when the angle of 3D projection includes a left-eye angle of 3D projection and a right-eye angle of 3D projection, the performing, by the user terminal based on the angle of 3D projection, 3D display on content that needs to be displayed may include performing, by the user terminal based on the left-eye angle of 3D projection and the right-eye angle of 3D projection, drawing on the content that needs to be displayed, and displaying a drawing result by using a 3D display.

By means of implementing this implementation, the user terminal may determine different angles of 3D projection as the viewing angle of the user varies. Therefore, the user terminal can display images of the different angles of 3D projection by using the 3D display, so that the 3D display effect is vivider and an image viewed by the user is clearer, thereby improving the 3D display effect.

In an optional implementation, when the viewing angle detected by the user terminal is a medial-axis angle of view, the determining, by the user terminal, an angle of 3D projection based on the viewing angle may include determining, by the user terminal, the medial-axis angle of view as the angle of 3D projection.

By means of implementing this implementation, the user terminal can accurately determine the angle of 3D projection.

In an optional implementation, if the user terminal determines the medial-axis angle of view as the angle of 3D projection, the performing, by the user terminal based on the angle of 3D projection, 3D display on content that needs to be displayed may include performing, by the user terminal based on the angle of 3D projection, drawing on the content that needs to be displayed, and displaying a drawing result by using a 2D display or a holographic display.

By means of implementing this implementation, the user terminal may determine different angles of 3D projection as the viewing angle of the user varies. Therefore, the user terminal can display images of different angles by using the 2D display or the holographic display, so that the 3D display effect is vivider, thereby improving the 3D display effect.

According to a second aspect, a user terminal is provided. The user terminal has a function of implementing an action of the user terminal according to the first aspect or a possible implementation of the first aspect. The function may be implemented by hardware, or may be implemented by hardware executing corresponding software. The hardware or software includes one or more units corresponding to the foregoing function. The unit may be software and/or hardware. Based on a same inventive concept, for a principle of resolving a problem by the user terminal and beneficial effects, refer to the first aspect, possible method implementations of the first aspect, and beneficial effects arising. Therefore, for an implementation of the user terminal, refer to the first aspect and the possible method implementations of the first aspect. Details are not repeated herein again.

According to a third aspect, a user terminal is provided. The user terminal includes a display, one or more processors, a memory, a bus system, and one or more programs. The one or more processors and the memory are connected to each other by using the bus system. The one or more programs are stored in the memory. The one or more programs include instructions. The processor invokes the instructions stored in the memory to implement the solution in a method design of the first aspect. For an implementation of resolving a problem by the user terminal and beneficial effects, refer to the first aspect, possible method implementations of the first aspect, and beneficial effects. Therefore, for an implementation of the user terminal, refer to an implementation of the method. Details are not repeated herein again.

According to a fourth aspect, a computer readable storage medium storing one or more programs is provided. The one or more programs include instructions. When being executed by a user terminal, the instructions cause the user terminal to perform the method according to the first aspect or a possible implementation of the first aspect.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the technical solutions of the embodiments of the present invention with reference to the accompanying drawings.

To help understand the embodiments of the present invention, the following describes technical terms used during implementation of the present invention.

A two-dimensional (2D) display is a display that may display a two-dimensional planar image. Currently, some 2D displays may perform 3D display by displaying an image of a 3D model. An image displayed during 3D display can be three-dimensional and vivid without being limited on a plane of a screen any longer, thereby enabling a viewer to feel personally on the scene.

A three-dimensional (3D) display is a display that performs 3D display by taking advantage of a feature that parallax exists between both eyes of a human. For example, the 3D display may perform 3D display by using a glass-type 3D display technology (that is, a display technology in which a pair of glasses, a helmet, or another auxiliary tool needs to be worn to obtain a vivid three-dimensional image with a spatial depth) to a naked-eye 3D display technology (that is, a display technology in which a vivid three-dimensional image with a spatial depth can be obtained without the need to wear a pair of glasses, a helmet, or another auxiliary tool). The glass-type 3D display technology may further include technologies such as an anaglyphic 3D display technology, an active shutter 3D display technology, and a polarized 3D display technology. The naked-eye 3D display technology may further include technologies such as a light barrier 3D display technology, a lenticular lens 3D display technology, and a directional backlight 3D display technology.

A naked-eye 3D display is a display using a naked-eye 3D display technology, and belongs to one of 3D displays.

A holographic display is a display that performs 3D display by using a holographic technology. The holographic technology is a technology that reproduces a real three-dimensional image of an object by using a diffraction principle.

In an existing actual application, during 3D display performed by using any display, a user terminal performs 3D display by using a fixed angle of 3D projection.

Figure 1:
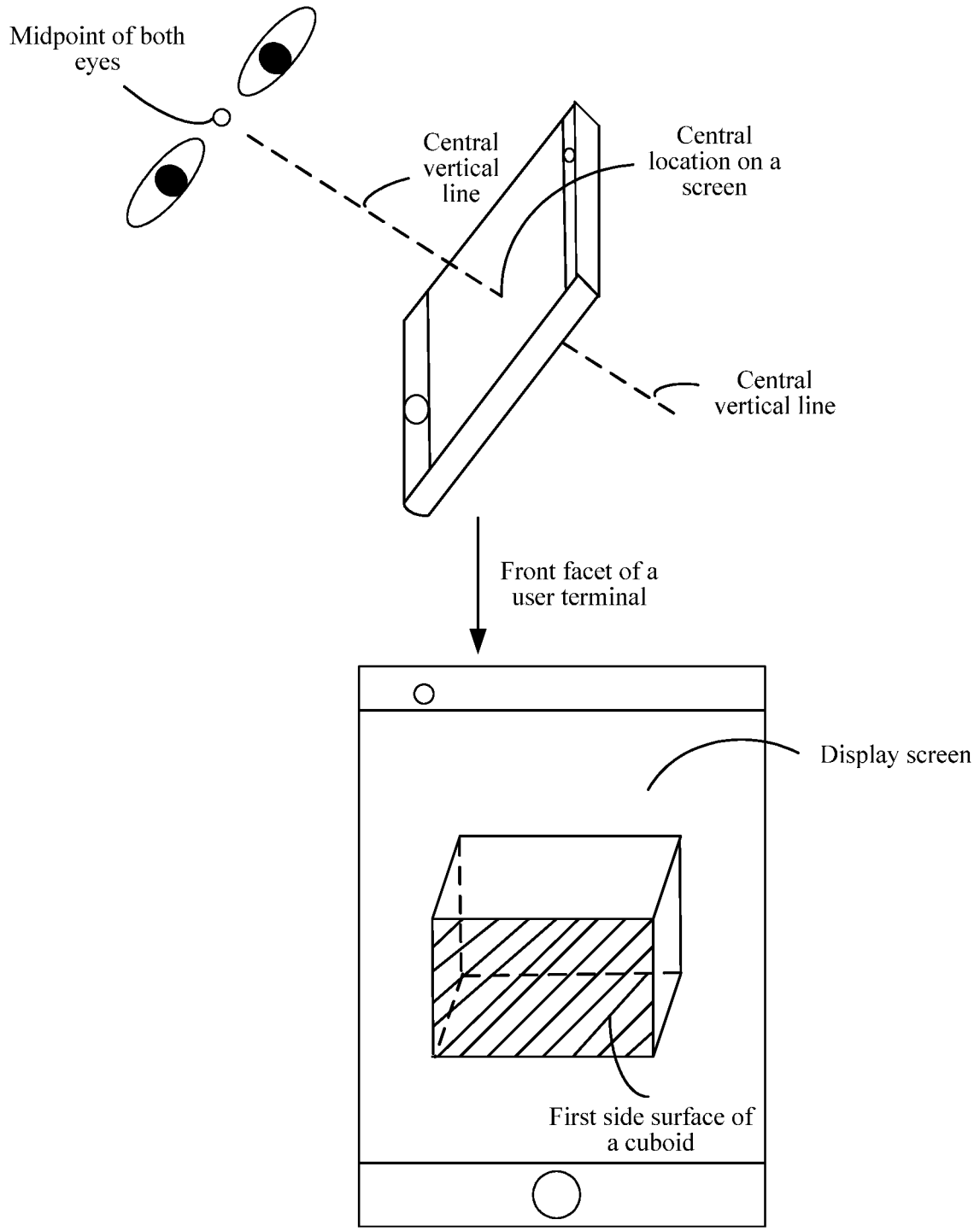
FIG. 1 to FIG. 3 are schematic diagrams of an existing 3D display effect according to an embodiment of the present invention.
Figure 2:
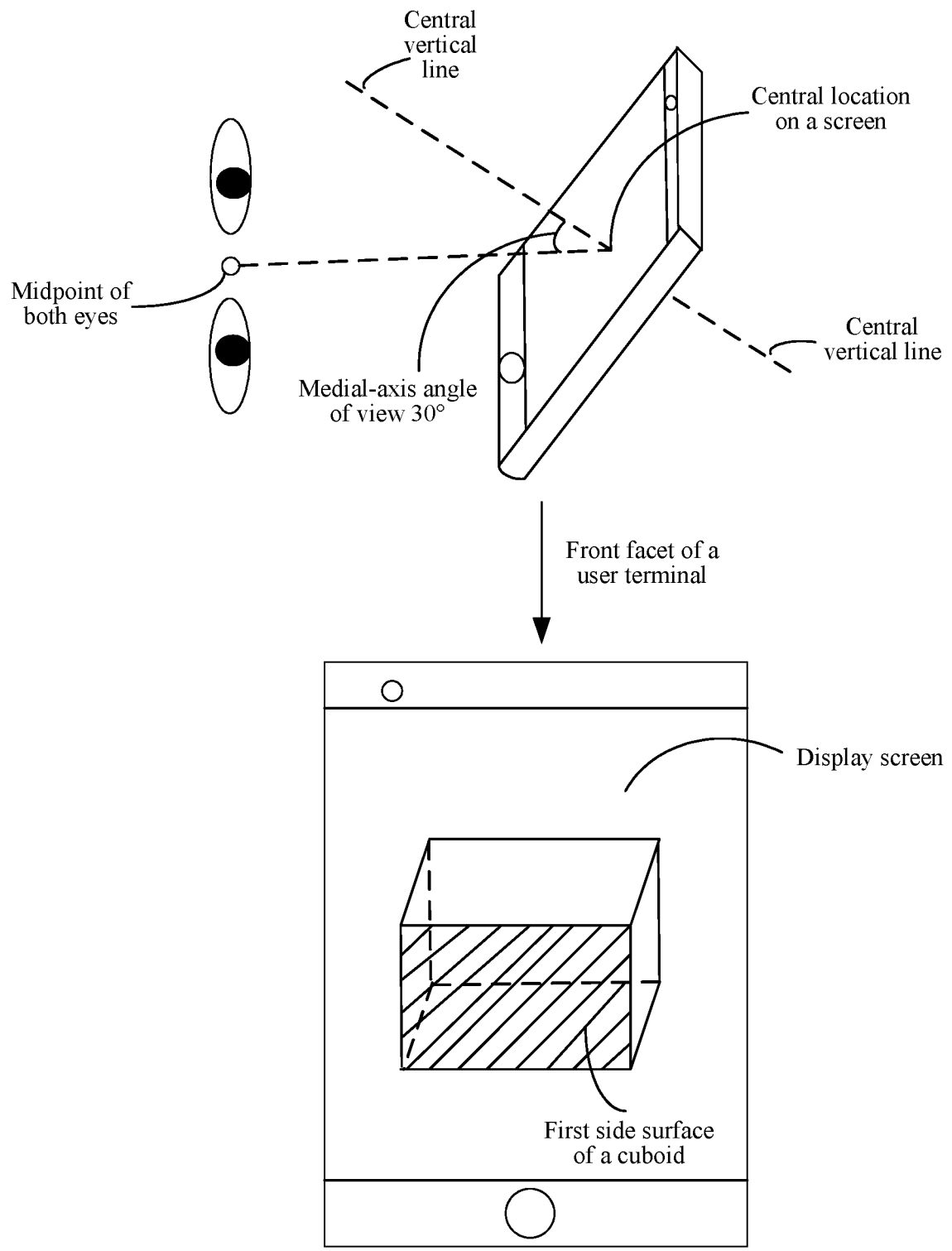

For example, in the existing actual application, when the user terminal performs 3D display by using a 2D display, if the user terminal displays a cuboid by using a fixed angle of 3D projection 0°, when an angle (where the angle is a medial-axis angle of view of a user) between a midpoint of both eyes of the user and a central vertical line (where the central vertical line in this specification is a line perpendicular to a central location on a display screen) is equal to 0°, a display effect of the cuboid is shown in FIG. 1, and a first side surface of the cuboid is output facing the screen. The first side surface is a shadow surface of the cuboid in FIG. 1. When the medial-axis angle of view of the user changes to 30°, as shown in FIG. 2, a display effect of the cuboid is the same as the display effect in FIG. 1, that is, the first side surface of the cuboid is output from the front of the screen. That is, regardless of a change in a viewing angle of the user, images displayed by the user terminal by using the 2D display are always the same, and an image viewed by the user does not change. Such a 3D display effect is not vivid and is relatively poor.

For another example, in the existing actual application, when the user terminal performs 3D display by using a holographic display, if the user terminal displays an image by using a fixed angle of 3D projection 0°, when an angle between a midpoint of both eyes of a user and a central vertical line is equal to 0°, a viewing effect of the displayed image viewed by the user is optimal. When a medial-axis angle of view of the user is not 0°, the user may not see the displayed image clearly, and a three-dimensional effect of the viewed image is not good.

Figure 3:
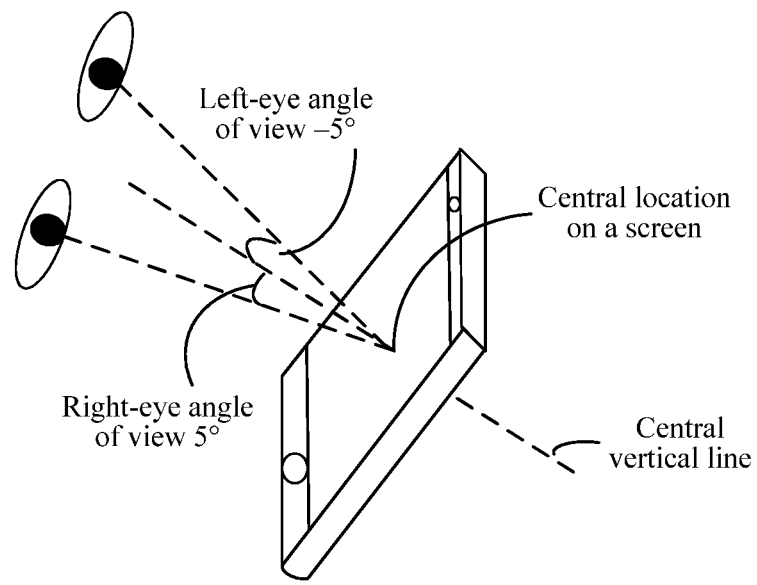

For another example, in the existing actual application, when the user terminal performs 3D display by using a 3D display, there are two angles of 3D projection of the user terminal, including a left-eye angle of 3D projection and a right-eye angle of 3D projection. If the user terminal performs 3D display by using a fixed left-eye angle of 3D projection −5° and a fixed right-eye angle of 3D projection 5°, as shown in FIG. 3, when an angle (where the angle is a left-eye angle of view of a user) between a midpoint of a left-eye pupil of the user and a central vertical line is equal to −5°, and an angle (where the angle is a right-eye angle of view of the user) between a midpoint of a right-eye pupil of the user and the central vertical line is 5°, a viewing effect of a displayed image viewed by the user is optimal. When the left-eye angle of view of the user is not −5° and the right-eye angle of view of the user is not 5°, the user may not see the displayed image clearly, and a three-dimensional effect of the viewed image is not good.

In the existing actual application, the user terminal performs 3D display by using a fixed angle of 3D projection, user experience of 3D display is relatively poor and the display needs to be further improved.

To resolve the foregoing problem of relatively poor 3D display effect, the present invention provides a 3D display method and a user terminal. The user terminal may be a terminal such as a mobile phone, a tablet computer, a personal computer (PC), a PDA (Personal Digital Assistant), a television, an in-vehicle computer, or a wearable device (such as a smartwatch). The user terminal may have a 2D display, a 3D display, a holographic display, or another display applicable to 3D display. This is not limited in this embodiment of the present invention.

Figure 4:
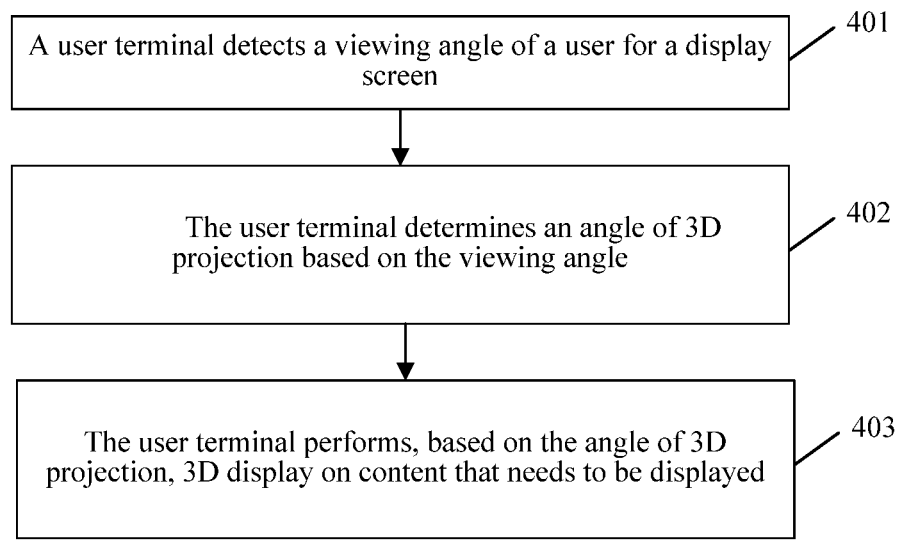
FIG. 4 is a schematic flowchart of a 3D display method according to an embodiment of the present invention.

Referring to FIG. 4, FIG. 4 is a schematic flowchart of a 3D display method according to an embodiment of the present invention. As shown in FIG. 4, the 3D display method may include steps 401 to 403.

In the part 401, a user terminal detects a viewing angle of a user for a display screen.

In an optional implementation, the viewing angle in the part 401 may be a medial-axis angle of view of the user, that is, an angle between a midpoint of both eyes of the user and a central vertical line. For example, the medial-axis angle of view may be shown in FIG. 2.

In an optional implementation, the viewing angle in the part 401 may include a left-eye angle of view and a right-eye angle of view. The left-eye angle of view is an angle between a midpoint of a left-eye pupil and a central vertical line, and the right-eye angle of view is an angle between a midpoint of a right-eye pupil and the central vertical line. For example, the left-eye angle of view and the right-eye angle of view may be shown in FIG. 3.

In an optional implementation, when the viewing angle in the part 401 is a medial-axis angle of view of the user, a specific implementation of the part 401 may include parts 11) and 12). Certainly, the user terminal may alternatively detect the medial-axis angle of view of the user in another manner. This is not limited in this embodiment of the present invention. The parts 11) and 12) are as follows.

11) The user terminal detects an angle of inclination of the user terminal relative to a plumb line, an angle of rotation at which the user terminal rotates around an axis of symmetry, and an angle between the midpoint of both eyes and a camera.

12) The user terminal performs calculation based on the angle of inclination, the angle of rotation, and the angle between the midpoint of both eyes and the camera, to obtain the medial-axis angle of view of the user.

By means of implementing this implementation, the user terminal can accurately determine the medial-axis angle of view of the user.

Figure 5:
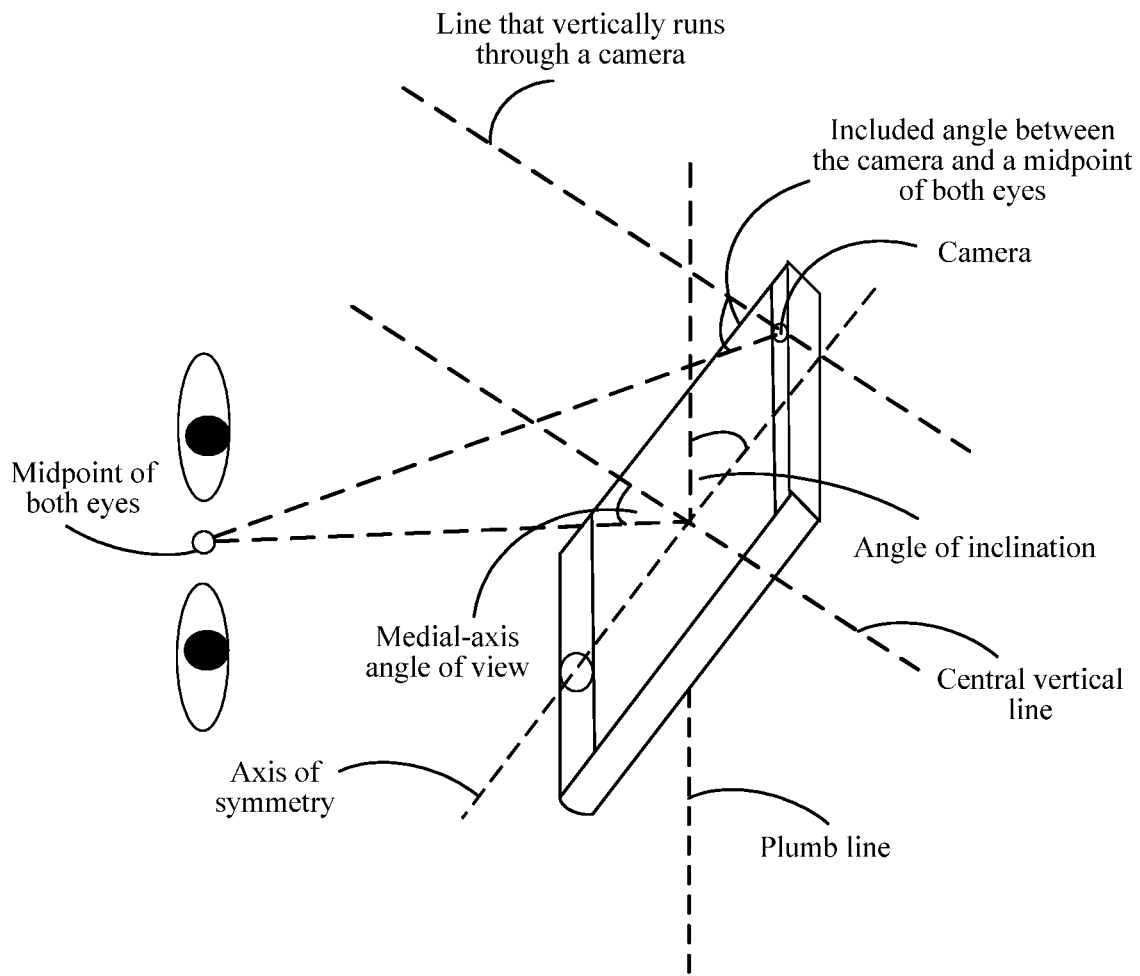
FIG. 5 and FIG. 6 are schematic diagrams of an angle according to an embodiment of the present invention.

In this implementation, the medial-axis angle of view (that is, the angle between the midpoint of both eyes and the central vertical line) of the user, the angle of inclination of the user terminal relative to the plumb line, and the angle between the midpoint of both eyes and the camera may be shown in FIG. 5.

As shown in FIG. 5, the angle of inclination of the user terminal relative to the plumb line is an angle between the axis of symmetry of the user terminal and the plumb line. The plumb line is a line in a direction same as a direction of gravity.

As shown in FIG. 5, the angle between the midpoint of both eyes and the camera is an angle between a line that vertically runs through the camera and that is parallel to the central vertical line and the midpoint of both eyes.

Figure 6:
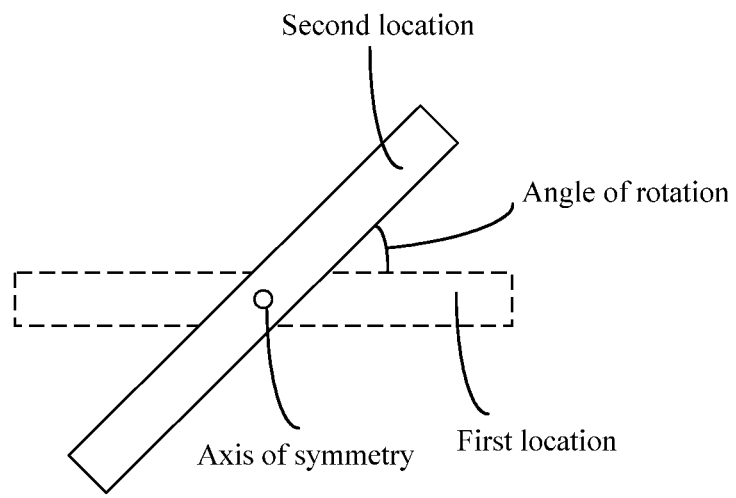

In this implementation, the angle of rotation at which user terminal rotates around the axis of symmetry may be shown in FIG. 6. FIG. 6 is a schematic top view of the user terminal. As shown in FIG. 6, if an angle of the user terminal at a first location is 0°, and the user terminal rotates around the axis of symmetry to a second location, the angle of rotation at which the user terminal rotates around the axis of symmetry is an angle between the first location and the second location.

In an optional implementation, the angle of inclination of the user terminal relative to the plumb line may be detected by using a gyroscope or a gravity sensor. Certainly, the angle of inclination may be alternatively detected by using another instrument. This is not limited in this embodiment of the present invention.

In an optional implementation, the angle of rotation at which the user terminal rotates around the axis of symmetry may be detected by using a gyroscope. Certainly, the angle of rotation may be alternatively detected by using another instrument. This is not limited in this embodiment of the present invention.

In an optional implementation, a specific implementation of detecting, by the user terminal, the angle between the midpoint of both eyes and the camera may be taking, by the user terminal, a photograph of the user by using the camera, and analyzing the photograph that is taken to obtain a distance between both eyes of the user, and obtaining, by the user terminal, the angle between the midpoint of both eyes and the camera based on a distance between the midpoint of both eyes and the camera and the distance between both eyes. The distance between the midpoint of both eyes and the camera may be detected by using a distance sensor (such as an infrared distance sensor or an ultrasonic distance sensor).

How the user terminal obtains the angle between the midpoint of both eyes and the camera based on the distance between both eyes and the distance between the midpoint of both eyes and the camera is a technology known in the art. Details are not described herein.

In an optional implementation, the user terminal may include a primary camera and at least one secondary camera. If the angle between the midpoint of both eyes and the camera in the parts 11) and 12) is an angle between the midpoint of both eyes and the primary camera, a specific implementation of detecting, by the user terminal, an angle between the midpoint of both eyes and the primary camera may be controlling, by the user terminal, the secondary camera and the primary camera to take photographs at the same time, obtaining, by the user terminal, the distance between the midpoint of both eyes and the camera and the distance between both eyes based on the photographs taken by the secondary camera and the primary camera, and obtaining, by the user terminal, the angle between the midpoint of both eyes and the primary camera based on the distance between the midpoint of both eyes and the primary camera and the distance between both eyes. How the user terminal obtains the distance between the midpoint of both eyes and the camera and the distance between both eyes based on the photographs taken by the secondary camera and the primary camera is a technology known in the art. Details are not described herein.

Certainly, the angle between the midpoint of both eyes of the user and the camera may be alternatively detected by using another instrument. This is not limited in this embodiment of the present invention.

In an optional implementation, the user terminal performs the parts 11) and 12) only during 3D display. When performing the part 11), the user terminal may detect in real time the angle of inclination of the user terminal relative to the plumb line, the angle of rotation at which the user terminal rotates around the axis of symmetry, and the angle between the midpoint of both eyes and the camera. In this way, after the medial-axis angle of view of the user changes, the user terminal can detect a new medial-axis angle of view of the user in a timely manner, and further, adjust an angle of 3D projection based on the new medial-axis angle of view in a timely manner.

In an optional implementation, when performing the part 11), the user terminal may detect in real time the angle of inclination of the user terminal relative to the plumb line, and the angle of rotation at which the user terminal rotates around the axis of symmetry. The user terminal may further detect whether a change in the angle of inclination or the angle of rotation exceeds a preset angle. The user terminal detects the angle between the midpoint of both eyes of the user and the camera only when the user terminal detects that the change in the angle of inclination or the angle of rotation exceeds the preset angle. In this way, during 3D display, the camera may not need to remain enabled to take photographs of the user to calculate the angle between the midpoint of both eyes of the user and the camera, thereby helping save a CPU resource.

Optionally, a specific implementation of detecting, by the user terminal, whether a change in the angle of inclination or the angle of rotation is greater than a preset angle may be determining, by the user terminal, whether an absolute value of a difference between a most recently detected angle of inclination and a first angle of inclination exceeds the preset angle, where the first angle of inclination is an angle of inclination that is detected when the angle between the midpoint of both eyes of the user and the camera is detected last time, or determining, by the user terminal, whether an absolute value of a difference between a most recently detected angle of rotation and a first angle of rotation exceeds the preset angle, where the first angle of rotation is an angle of rotation that is detected when the angle between the midpoint of both eyes of the user and the camera is detected last time.

In an optional implementation, when performing the part 11), the user terminal may detect, by using a preset time period, the angle of inclination of the user terminal relative to the plumb line, the angle of rotation at which the user terminal rotates around the axis of symmetry, and the angle between the midpoint of both eyes and the camera. In this way, the angle of inclination, the angle of rotation, and the angle between the midpoint of both eyes and the camera do not need to be detected constantly, thereby helping save a CPU resource.

In an optional implementation, when performing the part 12), the user terminal may specifically perform calculation according to the following formula 1 to obtain the medial-axis angle of view.

Formula 1: $\theta = \sqrt{\alpha^2 + \beta^2} + x*\lambda$. $\theta$ is the medial-axis angle of view. $\alpha$ is the angle of inclination of the user terminal relative to the plumb line. $\beta$ is the angle of rotation at which the user terminal rotates around the axis of symmetry. x is a correction parameter of the preset angle. $\lambda$ is an angle between the midpoint of both eyes and a camera.

In an optional implementation, when performing the part 12), the user terminal may specifically perform calculation according to the following formula 2 to obtain the medial-axis angle of view.

Formula 2: $\theta = \sqrt{(\alpha-\varepsilon)^2 + \beta^2} + x*\lambda$. $\theta$ is the medial-axis angle of view. $\alpha$ is the angle of inclination of the user terminal relative to the plumb line. $\beta$ is the angle of rotation at which the user terminal rotates around the axis of symmetry. x is a correction parameter of the preset angle. $\lambda$ is an angle between the midpoint of both eyes and a camera. $\varepsilon$ is a preset angle value, or may be an empirical value. For example, $\varepsilon$ may be 45° or 40°.

By means of the formula 1 and the formula 2, the user terminal can accurately determine the medial-axis angle of view.

Certainly, the user terminal may not perform calculation by using the foregoing formula 1 and formula 2 to obtain the medial-axis angle of view. This is not limited in this embodiment of the present invention.

In the part 402, the user terminal determines an angle of 3D projection based on the viewing angle detected in the part 401.

In an optional implementation, when the viewing angle detected in the part 401 is a medial-axis angle of view, a specific implementation of the part 402 may be determining, by the user terminal, the detected medial-axis angle of view as the angle of 3D projection.

For example, if the user terminal performs 3D display by using a 2D display or a holographic display, after detecting the medial-axis angle of view, the user terminal may directly determine the medial-axis angle of view as the angle of 3D projection.

Certainly, when the user terminal performs 3D display by using a display other than the 2D display and the holographic display, after detecting the medial-axis angle of view, the user terminal may also directly determine the medial-axis angle of view as the angle of 3D projection. This is not limited in this embodiment of the present invention.

In an optional implementation, the angle of 3D projection may include a left-eye angle of 3D projection and a right-eye angle of 3D projection. When the viewing angle detected in the part 401 is a medial-axis angle of view, a specific implementation of the part 402 may be determining, by the user terminal, the left-eye angle of 3D projection based on the detected medial-axis angle of view and a preset left-eye angle of adjustment, and determining, by the user terminal, the right-eye angle of 3D projection based on the detected medial-axis angle of view and a preset right-eye angle of adjustment.

The preset left-eye angle of adjustment and the preset right-eye angle of adjustment may be empirical values. For example, the preset left-eye angle of adjustment may be 3°, and the preset right-eye angle of adjustment may be −3°.

In this implementation, it may be understood that the user terminal obtains a left-eye angle of view of the user based on the medial-axis angle of view of the user and the preset left-eye angle of adjustment, and the user terminal determines the left-eye angle of view of the user that is obtained by means of calculation as the left-eye angle of 3D projection. Similarly, the user terminal obtains a right-eye angle of view of the user based on the medial-axis angle of view of the user and the preset left-eye angle of adjustment, and the user terminal determines the right-eye angle of view of the user that is obtained by means of calculation as the left-eye angle of 3D projection. Certainly, the user terminal may alternatively obtain the left-eye angle of view of the user and the right-eye angle of view of the user based on the medial-axis angle of view of the user in another manner. This is not limited in this embodiment of the present invention.

In an optional implementation, the user terminal may store a plurality of preset left-eye angles of adjustment and a plurality of preset right-eye angles of adjustment. The user terminal may prestore a correspondence between a preset medial-axis angle of view and a preset left-eye angle of adjustment. The user terminal may prestore a correspondence between a preset medial-axis angle of view and a preset right-eye angle of adjustment. After detecting the medial-axis angle of view of the user, the user terminal obtains the prestored preset left-eye angle of adjustment and preset right-eye angle of adjustment that correspond to the medial-axis angle of view, and determines the left-eye angle of 3D projection and the right-eye angle of 3D projection based on the medial-axis angle of view, and the preset left-eye angle of adjustment and the preset right-eye angle of adjustment that correspond to the medial-axis angle of view. For example, the user terminal may prestore in such a manner that a preset medial-axis angle of view 0° corresponds to a preset left-eye angle of adjustment 3°, and a preset medial-axis angle of view 10° corresponds to a preset left-eye angle of adjustment 4°. The user terminal may prestore in such a manner that the preset medial-axis angle of view 0° corresponds to a preset right-eye angle of adjustment −3°, and the preset medial-axis angle of view 10° corresponds to a preset right-eye angle of adjustment −4°. After detecting that the medial-axis angle of view of the user is 0°, the user terminal obtains the prestored preset left-eye angle of adjustment 3° and preset right-eye angle of adjustment −3° that correspond to the medial-axis angle of view 0°, and determines the left-eye angle of 3D projection and the right-eye angle of 3D projection based on the medial-axis angle of view 0°, and the preset left-eye angle of adjustment 3°, and the preset right-eye angle of adjustment −3°.

In an optional implementation, a specific implementation of determining, by the user terminal, the left-eye angle of 3D projection based on the medial-axis angle of view and the preset left-eye angle of adjustment may be that the user terminal may determine a difference (that is, the left-eye angle of view of the user terminal) between the medial-axis angle of view and the preset left-eye angle of adjustment as the left-eye angle of 3D projection. A specific implementation of determining, by the user terminal, the right-eye angle of 3D projection based on the medial-axis angle of view and the preset right-eye angle of adjustment may be that the user terminal may determine a difference (that is, the right-eye angle of view of the user terminal) between the medial-axis angle of view and the preset right-eye angle of adjustment as the right-eye angle of 3D projection. For example, the medial-axis angle of view of the user is 0°, the preset left-eye angle of adjustment may be 3°, and the preset right-eye angle of adjustment may be −3°. In this case, the user terminal may subtract 3° from 0° to obtain the left-eye angle of 3D projection being −3°, and subtract −3° from 0° to obtain the right-eye angle of 3D projection being 3°.

In an optional implementation, when the viewing angle detected in the part 401 includes a left-eye angle of view and a right-eye angle of view, a specific implementation of the part 402 may be determining the detected left-eye angle of view as the left-eye angle of 3D projection, and determining the detected right-eye angle of view as the right-eye angle of 3D projection.

In the part 403, the user terminal performs, based on the angle of 3D projection, 3D display on content that needs to be displayed.

Specifically, after detecting the angle of 3D projection, the user terminal performs, based on the angle of 3D projection, a drawing operation on the content that needs to be displayed, and displaying a drawing result by using a corresponding display.

In an optional implementation, if the user terminal determines the medial-axis angle of view as the angle of 3D projection, a specific implementation of the part 403 may be performing, by the user terminal based on the angle of 3D projection, drawing on the content that needs to be displayed, and displaying a drawing result by using a 2D display.

Specifically, after determining the medial-axis angle of view as the angle of 3D projection, the user terminal may send the angle of 3D projection to a graphics processing unit (GPU) of the user terminal. After obtaining the angle of 3D projection, the GPU performs, based on the angle of 3D projection, drawing on the content that needs to be displayed, and displays the drawing result by using the 2D display.

Optionally, a specific implementation of performing, by the GPU based on the angle of 3D projection, drawing on the content that needs to be displayed, and displaying the drawing result by using the 2D display may be rasterizing, by the GPU to a framebuffer based on the angle of 3D projection, the content that needs to be displayed, and displaying a drawing result in the framebuffer by using the 2D display. Optionally, the GPU may alternatively perform, based on the angle of 3D projection in another manner, drawing on the content that needs to be displayed. This is not limited in this embodiment of the present invention.

In an optional implementation, if the user terminal determines the medial-axis angle of view as the angle of 3D projection, a specific implementation of the part 403 may be performing, by the user terminal based on the angle of 3D projection, drawing on the content that needs to be displayed, and displaying a drawing result by using a holographic display.

Specifically, after determining the medial-axis angle of view as the angle of 3D projection, the user terminal may send the angle of 3D projection to a GPU of the user terminal. After obtaining the angle of 3D projection, the GPU performs, based on the angle of 3D projection, drawing on the content that needs to be displayed, and displays the drawing result by using the holographic display after the drawing is completed.

In an optional implementation, the performing, by the GPU based on the angle of 3D projection, drawing on the content that needs to be displayed may be implemented by using the following function: glRotatef(GLfloat angle, GLfloat x, GLfloat y, GLfloat z). angle is the angle of 3D projection. The function glRotatef (GLfloat angle, GLfloat x, GLfloat y, GLfloat z) is used to rotate a current coordinate system by an angle of angle by using a vector a (x, y, z) as an axis of rotation.

In an optional implementation, if the angle of 3D projection includes a left-eye angle of 3D projection and a right-eye angle of 3D projection, a specific implementation of the part 403 may be performing, by the user terminal based on the left-eye angle of 3D projection and the right-eye angle of 3D projection, drawing on the content that needs to be displayed, and displaying a drawing result by using a 3D display. The 3D display may be a naked-eye 3D display or a 3D display that needs to be viewed by wearing a pair of glasses, a helmet, or another auxiliary tool.

Specifically, after determining the left-eye angle of 3D projection and the right-eye angle of 3D projection, the user terminal may send the left-eye angle of 3D projection and the right-eye angle of 3D projection to a GPU of the user terminal. The GPU performs, based on the left-eye angle of 3D projection and the right-eye angle of 3D projection, drawing on the content that needs to be displayed, and displays the drawing result by using the 3D display.

Optionally, a specific implementation of performing, by the GPU based on the left-eye angle of 3D projection and the right-eye angle of 3D projection, drawing on the content that needs to be displayed may be rasterizing, by the GPU to a framebuffer based on the left-eye angle of 3D projection, the content that needs to be displayed, and rasterizing, to another framebuffer based on the right-eye angle of 3D projection, the content that needs to be displayed. Correspondingly, the 3D display displays drawing results in the two framebuffers. Optionally, the GPU may alternatively perform, based on the left-eye angle of 3D projection and the right-eye angle of 3D projection in another manner, the content that needs to be displayed. This is not limited in this embodiment of the present invention.

In an optional implementation, the performing, by the GPU based on the left-eye angle of 3D projection, drawing on the content that needs to be displayed may be implemented by using the following function: glRotatef(GLfloat angle, GLfloat x, GLfloat y, GLfloat z). angle is the left-eye angle of 3D projection. The function glRotatef (GLfloat angle, GLfloat x, GLfloat y, GLfloat z) is used to rotate a current coordinate system by an angle of angle by using a vector a (x, y, z) as an axis of rotation.

Similarly, the performing, by the GPU based on the right-eye angle of 3D projection, the content that needs to be displayed may be implemented by using the following function: glRotatef(GLfloat angle, GLfloat x, GLfloat y, GLfloat z). angle is the right-eye angle of 3D projection.

The following further describes this embodiment of the present invention by using specific application scenarios 1 to 4.

Figure 7:
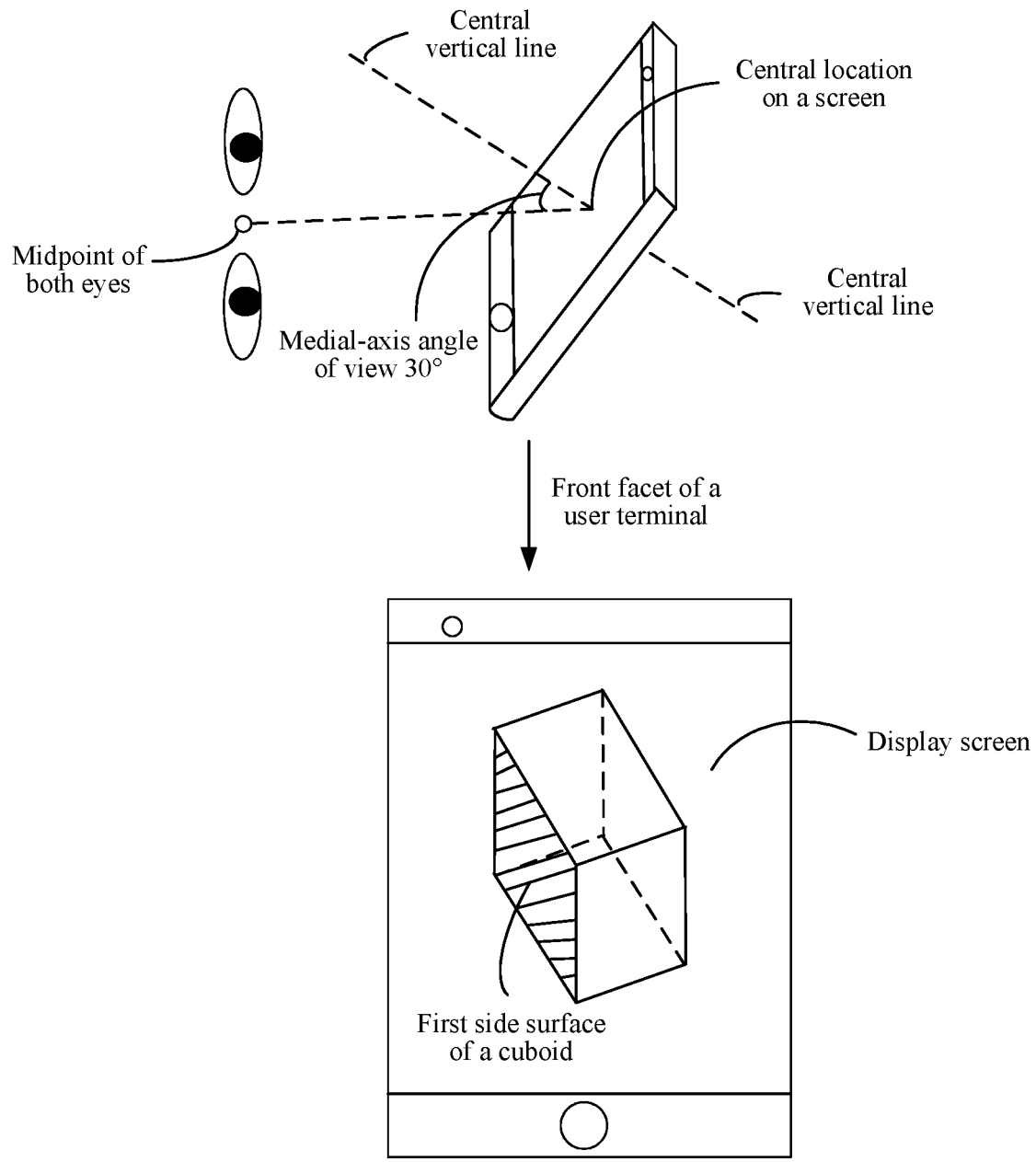
FIG. 7 is a schematic diagram of a 3D display effect according to an embodiment of the present invention.

An application scenario 1: The user terminal performs 3D display on a cuboid by using a 2D display. When the user terminal detects that the medial-axis angle of view of the user is 0°, the user terminal determines 0° as the angle of 3D projection. The user terminal performs drawing on the cuboid based on the angle of 3D projection 0°, and displays, by using the 2D display, the cuboid obtained by means of drawing. The display result may be shown in FIG. 1. When the user terminal detects that the medial-axis angle of view of the user is 30°, the user terminal determines 30° as the angle of 3D projection. The user terminal performs drawing on the cuboid based on the angle of 3D projection 30°, and displays, by using the 2D display, the cuboid obtained by means of drawing. The display result may be shown in FIG. 7.

An application scenario 2: The user terminal performs 3D display on a cuboid by using a holographic display. When the user terminal detects that the medial-axis angle of view of the user is 0°, the user terminal determines 0° as the angle of 3D projection. The user terminal performs drawing on the cuboid based on the angle of 3D projection 0°, and displays, by using the holographic display, the cuboid obtained by means of drawing. When the user terminal detects that the medial-axis angle of view of the user is 30°, the user terminal determines 300 as the angle of 3D projection. The user terminal performs drawing on the cuboid based on the angle of 3D projection 30°, and displays, by using the holographic display, the cuboid obtained by means of drawing.

An application scenario 3: The user terminal performs 3D display by using a 3D display. The user terminal may detect the left-eye angle of view and the right-eye angle of view of the user, determine the left-eye angle of view as the left-eye angle of 3D projection, and determine the right-eye angle of view as the right-eye angle of 3D projection. For example, if the user terminal detects that the left-eye angle of view of the user is −5° and the right-eye angle of view of the user is 5°, the user terminal determines −5° as the left-eye angle of 3D projection, determines 5° as the right-eye angle of 3D projection, performs drawing on the cuboid based on the left-eye angle of 3D projection −5° and the right-eye angle of 3D projection 5°, and displays, by using the 3D display, the cuboid obtained by means of drawing. If the user terminal detects that the left-eye angle of view of the user is 10° and the right-eye angle of view of the user is 20°, the user terminal determines 10° as the left-eye angle of 3D projection, determines 20° as the right-eye angle of 3D projection, performs drawing on the cuboid based on the left-eye angle of 3D projection 100 and the right-eye angle of 3D projection 200, and displays, by using the 3D display, the cuboid obtained by means of drawing.

An application scenario 4: The user terminal performs 3D display by using a 3D display. The user terminal detects the left-eye angle of view and the right-eye angle of view based on the medial-axis angle of view. A preset left-eye adjustment angle of view prestored in the user terminal is 5°, and a preset right-eye adjustment angle of view prestored in the user terminal is −5°. When the user terminal detects that the medial-axis angle of view of the user is 0°, the user terminal subtracts 5° from 0°, to obtain the left-eye angle of view −5°, and determines the left-eye angle of view −5° as the left-eye angle of 3D projection, and the user terminal subtracts −5° from 0°, to obtain the right-eye angle of view 5°, and determines the right-eye angle of view 5° as the right-eye angle of 3D projection. The user terminal performs drawing on the cuboid based on the left-eye angle of 3D projection −5° and the right-eye angle of 3D projection 5°, and displays, by using the 3D display, the cuboid obtained by means of drawing. Similarly, when the user terminal detects that the medial-axis angle of view of the user is 15°, the user terminal subtracts 5° from 15°, to obtain the left-eye angle of 3D projection 10°, and subtracts −5° from 15°, to obtain the right-eye angle of 3D projection 20°. The user terminal performs drawing on the cuboid based on the left-eye angle of 3D projection 10° and the right-eye angle of 3D projection 20°, and displays, by using the 3D display, the cuboid obtained by means of drawing.

It can be learned that by means of implementing the 3D display method provided in FIG. 4, the user terminal performs 3D display by using different angles of 3D projection as the viewing angle of the user varies, so that a 3D display effect can be vivider and a 3D image viewed by the user can be clearer, thereby improving the 3D display effect.

In this embodiment of the present invention, functional unit division may be performed for the user terminal based on the foregoing method examples. For example, the functional unit division may be performed corresponding to the functions, or two or more functions may be integrated in one unit. The integrated unit may be implemented in a form of hardware, or may be implemented in a form of a software functional unit. It should be noted that unit division in this embodiment of the present invention is an example and is merely logical function division. During actual implementation, there may be another division manner.

Figure 8:
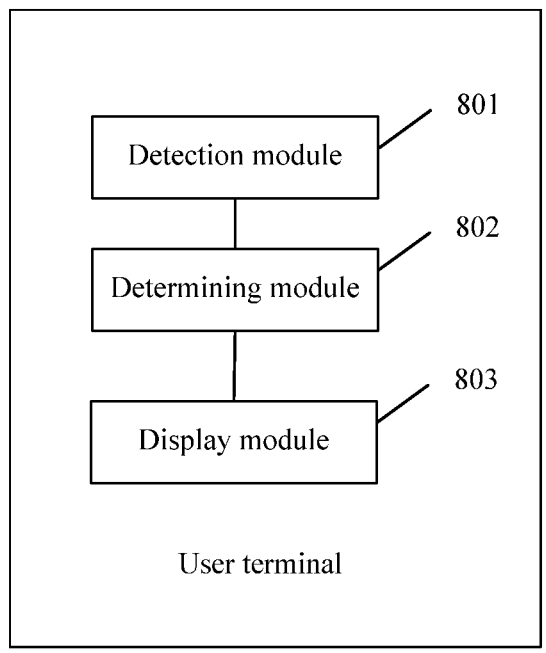
FIG. 8 is a schematic structural diagram of a user terminal according to an embodiment of the present invention.

Referring to FIG. 8, FIG. 8 is a schematic structural diagram of a user terminal according to an embodiment of the present invention. As shown in FIG. 8, the user terminal includes a detection module 801, a determining module 802, and a display module 803.

The detection module 801 is configured to detect a viewing angle of a user for a display screen.

The determining module 802 is configured to determine an angle of 3D projection based on the viewing angle.

The display module 803 is configured to perform, based on the angle of 3D projection, 3D display on content that needs to be displayed.

In an optional implementation, the viewing angle detected by the detection module 801 is a medial-axis angle of view, the medial-axis angle of view is an angle between a midpoint of both eyes and a central vertical line, and the central vertical line is a line perpendicular to a central location on the display screen.

In an optional implementation, when the viewing angle detected by the detection module 801 is a medial-axis angle of view, the determining module 802 is specifically configured to determine the medial-axis angle of view as the angle of 3D projection.

In an optional implementation, if the determining module 802 is specifically configured to determine the medial-axis angle of view as the angle of 3D projection, the display module 803 is specifically configured to perform, based on the angle of 3D projection, drawing on the content that needs to be displayed, and display a drawing result by using a 2D display or a holographic display.

In an optional implementation, the angle of 3D projection includes a left-eye angle of 3D projection and a right-eye angle of 3D projection, and when the viewing angle detected by the detection module 801 is a medial-axis angle of view, the determining module 802 is specifically configured to determine the left-eye angle of 3D projection based on the medial-axis angle of view detected by the detection module 801 and a preset left-eye angle of adjustment, and determine the right-eye angle of 3D projection based on the medial-axis angle of view detected by the detection module 801 and a preset right-eye angle of adjustment.

In an optional implementation, when the viewing angle detected by the detection module 801 includes a left-eye angle of view and a right-eye angle of view, the left-eye angle of view is an angle between a midpoint of a left-eye pupil and a central vertical line, and the right-eye angle of view is an angle between a midpoint of a right-eye pupil and the central vertical line.

In an optional implementation, the angle of 3D projection includes a left-eye angle of 3D projection and a right-eye angle of 3D projection, and when the viewing angle detected by the detection module 801 includes a left-eye angle of view and a right-eye angle of view, the determining module is specifically configured to determine the left-eye angle of view detected by the detection module 801 as the left-eye angle of 3D projection, and determine the right-eye angle of view detected by the detection module 801 as the right-eye angle of 3D projection.

In an optional implementation, when the angle of 3D projection includes the left-eye angle of 3D projection and the right-eye angle of 3D projection, the display module is specifically configured to perform, based on the left-eye angle of 3D projection and the right-eye angle of 3D projection, drawing on the content that needs to be displayed, and display a drawing result by using a 3D display.

The detection module 80o is configured to perform the method of step 401 in FIG. 4 of the method embodiment of the present invention. For an implementation of the detection module 801, refer to the description corresponding to step 401 in FIG. 4 of the method embodiment of the present invention. Details are not described herein again. The determining module 802 is configured to perform the method of step 402 in FIG. 4 of the method embodiment of the present invention. For an implementation of the determining module 802, refer to the description corresponding to step 402 in FIG. 4 of the method embodiment of the present invention. Details are not described herein again. The display module 803 is configured to perform the method of step 403 in FIG. 4 of the method embodiment of the present invention. For an implementation of the display module 803, refer to the description corresponding to step 403 in FIG. 4 of the method embodiment of the present invention. Details are not described herein again.

Figure 9:
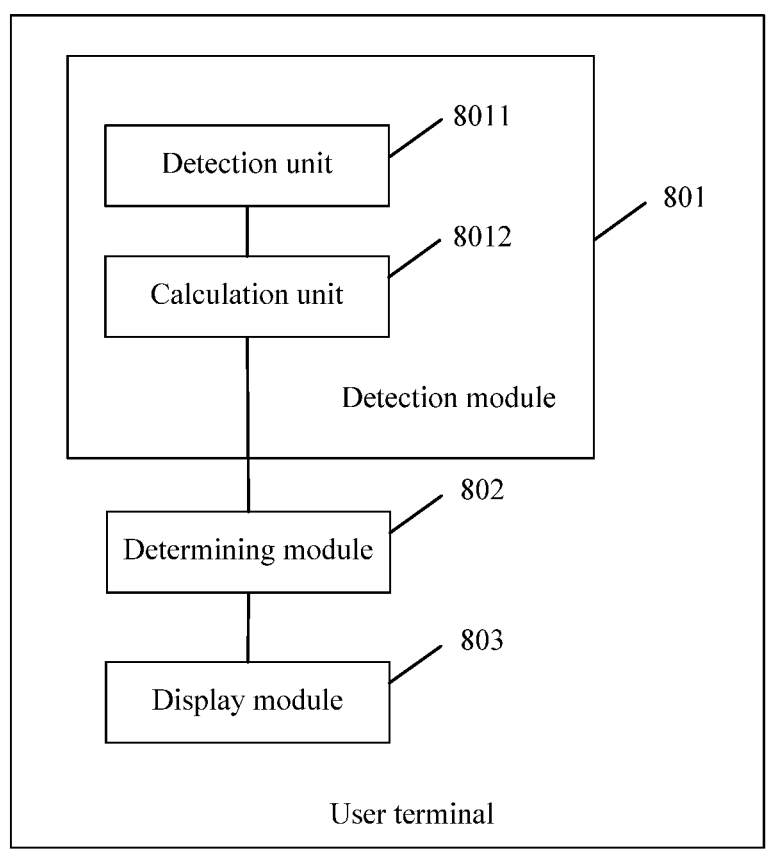
FIG. 9 is a schematic structural diagram of another user terminal according to an embodiment of the present invention.

Further referring to FIG. 9, FIG. 9 is a schematic structural diagram of another user terminal according to an embodiment of the present invention. The user terminal shown in FIG. 9 is an optimization of the user terminal shown in FIG. 8. The user terminal shown in FIG. 9 includes all the modules shown in FIG. 8. The detection module 801 of the user terminal in FIG. 9 includes a detection unit 8011 and a calculation unit 8012.

The detection unit 8011 is configured to detect an angle of inclination of the user terminal relative to a plumb line, an angle of rotation at which the user terminal rotates around an axis of symmetry, and an angle between the midpoint of both eyes and a camera.

The calculation unit 8012 is configured to perform calculation based on the angle of inclination, the angle of rotation, and the angle between the midpoint of both eyes and the camera, to obtain the medial-axis angle of view.

In an optional implementation, the detection unit 8011 is specifically configured to detect the angle of inclination of the user terminal relative to the plumb line, and the angle of rotation at which the user terminal rotates around the axis of symmetry, and detect the angle between the midpoint of both eyes and the camera when it is detected that a change in the angle of inclination or the angle of rotation is greater than a preset angle.

For specific implementations of the detection unit 8011 and the calculation unit 8012, refer to the descriptions corresponding to the foregoing method embodiment. For ease of description, details are not described herein again.

Based on a same inventive concept, a principle of resolving a problem by a user terminal in a 3D display method provided in this embodiment of the present invention is similar to that of the 3D display method in the method embodiment of the present invention. Therefore, for an implementation of the user terminal, refer to the implementation of the method. For ease of description, details are not described herein again.

Figure 10:
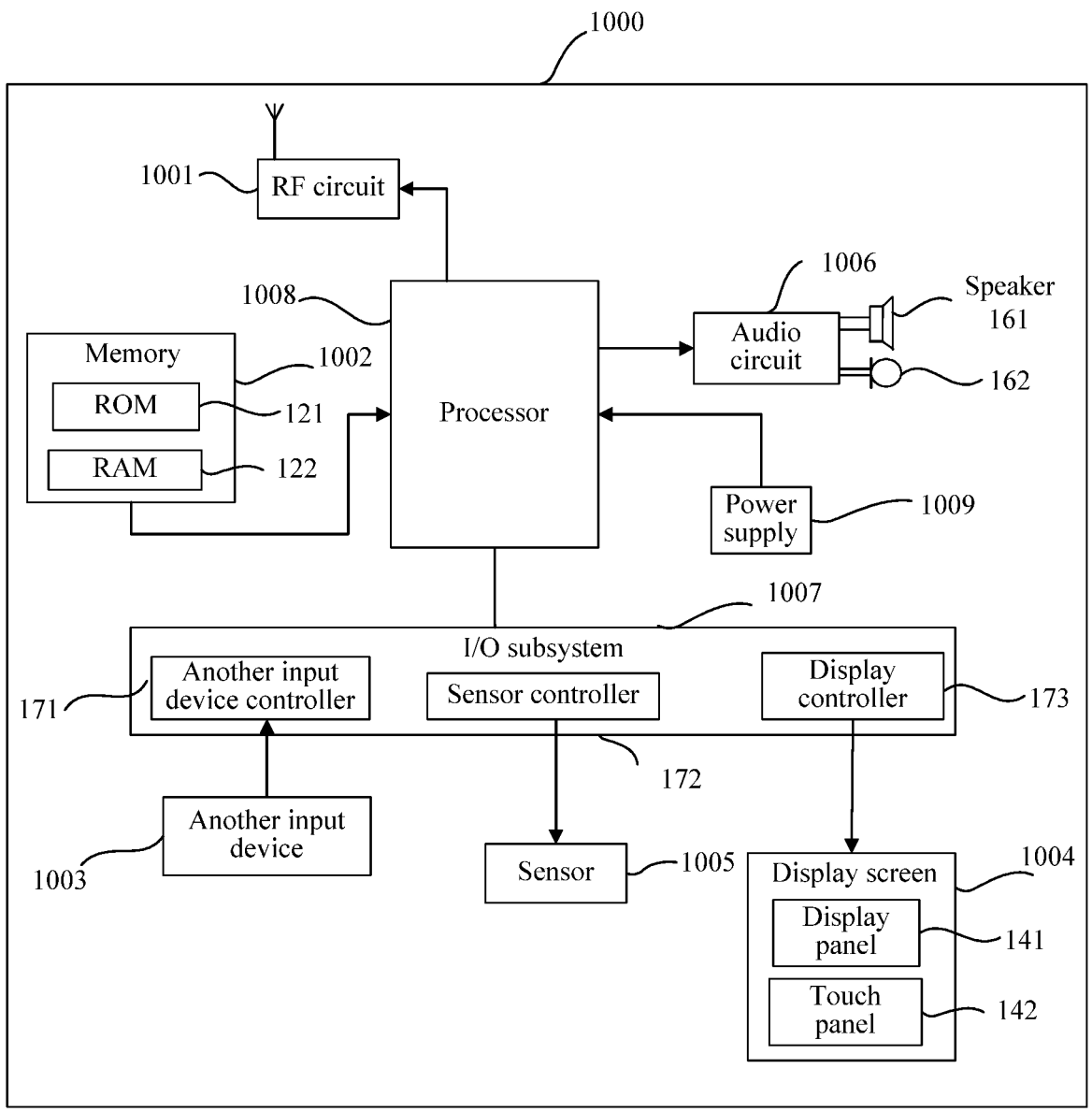
FIG. 10 is a schematic structural diagram of still another user terminal according to an embodiment of the present invention.

An embodiment of the present invention further provides a user terminal. In an example, the user terminal is a mobile phone. FIG. 10 is a block diagram of a partial structure of the mobile phone 1000 related to this embodiment of the present invention. Referring to FIG. 10, the mobile phone 1000 includes components such as an RF (radio frequency) circuit 1001, a memory 1002, another input device 1003, a display screen 1004, a sensor 1005, an audio circuit 1006, an I/O subsystem 1007, a processor 1008, and a power supply 1009. A person skilled in the art may understand that the structure of the mobile phone shown in FIG. 10 does not constitute a limitation to the mobile phone, and the mobile phone may include more components or fewer components than those shown in the figure, or some components may be combined, or some components may be separated, or a different component deployment may be used.

The following specifically describes the components of the mobile phone 1000 with reference to FIG. 10.

The RF circuit 1001 may be configured to receive and send signals during an information receiving and sending process or a call process. Specifically, the RF circuit 1001 receives downlink information from a base station, then delivers the downlink information to the processor 1008 for processing, and sends related uplink data to the base station. Generally, the RF circuit includes but is not limited to an antenna, at least one amplifier, a transceiver, a coupler, an LNA (low noise amplifier), a duplexer, and the like. In addition, the RF circuit 1001 may also communicate with a network and another device by means of wireless communication. The wireless communication may use any communications standard or protocol, including but not limited to, GSM (Global system for mobile communications), GPRS (general packet radio service), CDMA (Code Division Multiple Access), WCDMA (Wideband Code Division Multiple Access), LTE (Long Term Evolution), email, SMS (short messaging service), and the like.

The memory 1002 may be configured to store computer executable program code. The program code includes an instruction. The processor 1008 executes a software program stored in the memory 1002 and a module, to implement various functional applications of the mobile phone 1000 and data processing. A program storage area may store an operating system, an application program required by at least one function (such as a sound playback function and an image display function), and the like. A data storage area may store data (such as audio data and a telephone directory) created based on use of the mobile phone 1000, and the like. In addition, the memory 1002 may include a ROM and a RAM, and may further include a high-speed random access memory, a non-volatile memory, such as at least one magnetic disk storage device, a flash memory, or other volatile solid-state storage devices.

The another input device 1003 may be configured to receive input digit or character information, and generate a signal input related to a user setting and functional control of the mobile phone 1000. Specifically, the another input device 1003 may include but is not limited to one or more of a physical keyboard, a functional button (such as a sound volume control button or a power button), a trackball, a mouse, a joystick, and an optical mouse (where the optical mouse is a touch-sensitive surface that does not display a visible output, or an extension of a touch-sensitive surface including a touchscreen). The another input device 1003 is connected to another input device controller 171 of the I/O subsystem 1007, and exchange, under control of the another device input controller 171, signals with the processor 1008.

The display screen 1004 may be configured to display information input by the user or information provided for the user, and various menus of the mobile phone 1000, or may receive an input by the user. For example, the display screen 1004 may display information that needs to be displayed in the foregoing method embodiment, for example, an unread dedicated message, a selection list including message options, a selection list including a plurality of time period options, a jump-up arrow, or a jump-down arrow. Specifically, the display screen 1004 may include a display panel 141 and a touch panel 142. The display panel 141 may be configured by using an LCD (liquid crystal display), or an OLED (organic light-emitting diode), or in another form. The touch panel 142 is also referred to as a touchscreen, a touch-sensitive screen, or the like, and may collect a contact or non-contact operation of a user on or near the touch panel 142 (such as an operation of a user on or near the touch panel 142 by using any suitable object or attachment, such as a finger or a touch pen, or a motion sensing operation may be included. The operation includes a single-point control operation, a multi-point control operation, another type of operation, or the like. In addition, a corresponding connecting apparatus is driven based on a preset program. Optionally, the touch panel 142 may include two parts, including a touch detection apparatus and a touch controller. The touch detection apparatus detects a touch location and a gesture of the user, detects a signal generated by the touch operation, and transfers the signal to the touch controller. The touch controller receives the touch information from the touch detection apparatus, converts the touch information into information that can be processed by the processor, and then sends the information to the processor 1008. In addition, the touch controller can receive a command sent by the processor 1008 and execute the command In addition, the touch panel 142 may be implemented by using various types, such as a resistive type, a capacitance type, an infrared type, and a surface sound wave type. Alternatively, the touch panel 142 may be implemented by using any technology developed in the future. Further, the touch panel 142 may cover the display panel 141. The user may perform, based on content displayed on the display panel 141 (where the displayed content includes but is not limited to a soft keyboard, a virtual mouse, a virtual key, an icon, or the like), an operation on or near the touch panel 142 covering the display panel 141. After detecting the touch operation on or near the touch panel 142, the touch panel 142 transfers the touch operation to the processor 1008 by using the I/O subsystem 1007 to determine a type of a touch event, to determine a user input. Subsequently, the processor 1008 provides a corresponding visual output on the display panel 141 based on the type of the touch event and based on the user input by using the I/O subsystem 1007. Although in FIG. 10, the touch panel 142 and the display panel 141 are used as two separate components to implement input and output functions of the mobile phone 1000, in some embodiments, the touch panel 142 and the display panel 141 may be integrated to implement the input and output functions of the mobile phone 1000.

The mobile phone 1000 may further include at least one type of sensor 1005, such as a fingerprint sensor, an optical sensor, a motion sensor, a gravity sensor, a gyroscope, and another sensor. Specifically, the optical sensor may include an ambient light sensor and a proximity sensor. The ambient light sensor may adjust luminance of the display panel 141 based on brightness of the ambient light. The proximity sensor may switch off the display panel 141 and/or backlight when the mobile phone 1000 is moved to the ear. As one type of motion sensor, an acceleration sensor may detect magnitude of accelerations in various directions (generally on three axes), may detect magnitude and a direction of the gravity when static, and may be configured to identify an application of the mobile phone gesture (such as switchover between landscape orientation and portrait orientation, a related game, and gesture calibration of a magnetometer), a function related to vibration recognition (such as a pedometer and a knock), and the like. Other sensors such as a gyroscope, a barometer, a hygrometer, a thermometer, and an infrared sensor, which may be configured in the mobile phone 1000, are not further described herein.

The audio circuit 1006, a speaker 161, and a microphone 162 may provide audio interfaces between the user and the mobile phone 1000. The audio circuit 1006 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 1006 receives the electrical signal and converts the electrical signal into audio data, and outputs the audio data to the RF circuit 1001 to send the audio data to, for example, another mobile phone, or outputs the audio data to the memory 1002 for further processing.

The I/O subsystem 1007 is configured to control a peripheral input/output device, and may include the another input device controller 171, a sensor controller 172, a display controller 173. Optionally, one or more other input device controllers 171 receive a signal from the another input device 1003 and/or send a signal to the another input device 1003. The another input device 1003 may include a physical button (a press button, a rocker button, or the like), a dial, a slider switch, a joystick, a click scroll wheel, and an optical mouse (where the optical mouse is a touch-sensitive surface that does not display a visible output, or an extension of a touch-sensitive surface including a touchscreen). It should be noted that the another input device controller 171 may be connected to any one or more of the foregoing devices. The display controller 173 in the I/O subsystem 1007 receives a signal from the touchscreen 1004 or sends a signal to the touchscreen 1004. After the display screen 1004 detects the input by the user, the display controller 173 converts the detected input by the user into an interaction of a user interface object displayed on the display screen 1004, that is, a human-computer interaction is implemented. The sensor controller 172 may receive a signal from one or more sensors 1005 and/or send a signal to one or more sensors 1005.

The processor 1008 is a control center of the mobile phone 1000, and is connected to various parts of the mobile phone by using various interfaces and lines. By running or executing the software program and/or the module stored in the memory 1002, and invoking data stored in the memory 1002, the processor 1008 performs various functions and data processing of the mobile phone 1000, thereby performing overall monitoring on the mobile phone. Optionally, the processor 1008 may include one or more processing units. Preferably, the processor 1008 may integrate an application processor and a modem processor. The application processor mainly processes an operating system, a user interface, an application program, and the like. The modem processor mainly processes wireless communication. It may be understood that the foregoing modem processor may alternatively not be integrated into the processor 1008. When the processor 1008 executes the instruction stored in the memory 1002, the instruction causes the mobile phone 1000 to perform the 3D display method of the embodiments of the present invention. For this, refer to the corresponding descriptions of the parts 401 to 403 in FIG. 4 in the foregoing method or another execution process of the user terminal in the foregoing method embodiment. Details are not described herein again. Based on a same inventive concept, a principle of resolving a problem by a user terminal for software program installation provided in this embodiment of the present invention is similar to that of a software program installation method in the method embodiment of the present invention. Therefore, for an implementation of the user terminal, refer to the implementation of the foregoing method. For ease of description, details are not described herein again.

The mobile phone 1000 further includes the power supply 1009 (such as a battery) supplying power to the components. Preferably, the power supply may be logically connected to the processor 1008 by using a power management system, so as to implement functions such as charging, discharging, and energy consumption management by using the power management system.

Although not shown in the figure, the mobile phone 1000 may further include a camera, a Bluetooth module, and the like, and details are not described herein.

In addition, an embodiment of the present invention further provides a non-volatile computer readable storage medium storing one or more programs. The non-volatile computer readable storage medium stores at least one program, and each of the programs includes an instruction. When being executed by the user terminal provided in the embodiments of the present invention, the instruction causes the user terminal to perform the parts 401 to 403 in FIG. 4 in the embodiments of the present invention or another execution process of the user terminal in the foregoing method embodiment. For this, refer to the corresponding descriptions of the parts 401 to 403 in FIG. 4 in the method embodiment or another execution process of the user terminal in the foregoing method embodiment. Details are not described herein again.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A method, comprising:
   detecting, by a user terminal, a viewing angle at which a user views a display screen of the user terminal, the viewing angle being relative to the display screen;
   determining, by the user terminal based on the viewing angle of the user, an angle of three-dimensional (3D) projection for 3D display on the display screen; and
   performing, based on the angle of 3D projection, 3D display of content that needs to be displayed on the display screen; and
   wherein the viewing angle is a medial-axis angle of view, wherein the medial-axis angle of view is an angle between a midpoint of both eyes of the user and a central vertical line, and wherein the central vertical line is a line perpendicular to a central location on the display screen.

2. The method according to claim 1, wherein the detecting the viewing angle comprises:
   detecting an angle of inclination of the user terminal relative to a plumb line, an angle of rotation at which the user terminal rotates around an axis of symmetry, and an angle between the midpoint of the both eyes and a camera; and performing calculation, based on the angle of inclination, the angle of rotation, and the angle between the midpoint of the both eyes and the camera, to obtain the medial-axis angle of view.

3. The method according to claim 2, wherein the detecting the angle of inclination of the user terminal relative to the plumb line, the angle of rotation at which the user terminal rotates around the axis of symmetry, and the angle between the midpoint of the both eyes and the camera comprises:

detecting the angle of inclination of the user terminal relative to the plumb line and the angle of rotation at which the user terminal rotates around the axis of symmetry; and detecting the angle between the midpoint of the both eyes and the camera when it is detected that a first change in the angle of inclination or a second change in the angle of rotation is greater than a preset angle.

4. The method according to claim 1, wherein the angle of 3D projection comprises a left-eye angle of 3D projection and a right-eye angle of 3D projection, and wherein the determining the angle of 3D projection based on the viewing angle comprises:

determining the left-eye angle of 3D projection based on the medial-axis angle of view and a preset left-eye angle of adjustment; and determining the right-eye angle of 3D projection based on the medial-axis angle of view and a preset right-eye angle of adjustment.

5. The method according to claim 4, wherein the preset left-eye angle of adjustment corresponds to the medial-axis angle of view, and there is a first prestored correspondence between a preset medial-axis angle of view and the preset left-eye angle of adjustment; and wherein the preset right-eye angle of adjustment corresponds to the medial-axis angle of view and there is a second prestored correspondence between the preset medial-axis angle of view and the preset right-eye angle of adjustment.

6. The method according to claim 4, wherein the performing the 3D display of the content that needs to be displayed comprises:

drawing, based on the left-eye angle of 3D projection and the right-eye angle of 3D projection, the content that needs to be displayed; and displaying a drawing result by using the 3D display.

7. The method according to claim 1, wherein the determining the angle of 3D projection based on the viewing angle comprises:

determining the medial-axis angle of view as the angle of 3D projection.

8. The method according to claim 7, wherein the performing, based on the angle of 3D projection, the 3D display of the content that needs to be displayed comprises:

drawing, based on the angle of 3D projection, the content that needs to be displayed; and displaying a drawing result by using at least one of a two-dimensional (2D) display or a holographic display.

9. The method according to claim 1, wherein the viewing angle comprises a left-eye angle of view and a right-eye angle of view, wherein the left-eye angle of view is an angle between a midpoint of a left-eye pupil and the central vertical line, and wherein the right-eye angle of view is an angle between a midpoint of a right-eye pupil and the central vertical line.

10. The method according to claim 9, wherein the angle of 3D projection comprises a left-eye angle of 3D projection and a right-eye angle of 3D projection, and wherein the determining the angle of 3D projection based on the viewing angle comprises:

determining the left-eye angle of view as the left-eye angle of 3D projection; and determining the right-eye angle of view as the right-eye angle of 3D projection.

11. A user terminal, comprising:
a display screen;
one or more processors; and
a non-transitory computer-readable storage medium storing a program to be executed by the one or more processors, the program including instructions for:

detecting a viewing angle at which a user views the display screen, the viewing angle being relative to the display screen;

determining an angle of three-dimensional (3D) projection based on the viewing angle of the user for performing 3D display on the display screen; and performing, based on the angle of 3D projection, 3D display of content that needs to be displayed on the display screen; and wherein the viewing angle is a medial-axis angle of view, wherein the medial-axis angle of view is an angle between a midpoint of both eyes of the user and a central vertical line, and wherein the central vertical line is a line perpendicular to a central location on the display screen.

12. The user terminal according to claim 11, wherein the detecting the viewing angle comprises:

detecting an angle of inclination of the user terminal relative to a plumb line, an angle of rotation at which the user terminal rotates around an axis of symmetry, and an angle between the midpoint of the both eyes and a camera; and performing calculation, based on the angle of inclination, the angle of rotation, and the angle between the midpoint of the both eyes and the camera, to obtain the medial-axis angle of view.

13. The user terminal according to claim 12, wherein the detecting the angle of inclination of the user terminal relative to the plumb line, the angle of rotation at which the user terminal rotates around the axis of symmetry, and the angle between the midpoint of the both eyes and the camera comprises:

detecting the angle of inclination of the user terminal relative to the plumb line and the angle of rotation at which the user terminal rotates around the axis of symmetry; and detecting the angle between the midpoint of the both eyes and the camera when it is detected that a first change in the angle of inclination or a second change in the angle of rotation is greater than a preset angle.

14. The user terminal according to claim 11, wherein the angle of 3D projection comprises a left-eye angle of 3D projection and a right-eye angle of 3D projection, and wherein the determining the angle of 3D projection based on the viewing angle comprises:

determining the left-eye angle of 3D projection based on the medial-axis angle of view and a preset left-eye angle of adjustment; and determining the right-eye angle of 3D projection based on the medial-axis angle of view and a preset right-eye angle of adjustment.

15. The user terminal according to claim 14, wherein the preset left-eye angle of adjustment corresponds to the medial-axis angle of view and there is a first prestored correspondence between a preset medial-axis angle of view and the preset left-eye angle of adjustment; and
wherein the preset right-eye angle of adjustment corresponds to the medial-axis angle of view and there is in a second prestored correspondence between the preset medial-axis angle of view and the preset right-eye angle of adjustment.

16. The user terminal according to claim 14, wherein the performing the 3D display of the content that needs to be displayed comprises:
drawing, based on the left-eye angle of 3D projection and the right-eye angle of 3D projection, the content that needs to be displayed; and
displaying a drawing result by using the 3D display.

17. The user terminal according to claim 11, wherein the viewing angle comprises a left-eye angle of view and a right-eye angle of view, wherein the left-eye angle of view is an angle between a midpoint of a left-eye pupil and the central vertical line, and wherein the right-eye angle of view is an angle between a midpoint of a right-eye pupil and the central vertical line.

18. The user terminal according to claim 17, wherein the angle of 3D projection comprises a left-eye angle of 3D projection and a right-eye angle of 3D projection, and wherein the determining the angle of 3D projection based on the viewing angle comprises:
determining the left-eye angle of view as the left-eye angle of 3D projection; and
determining the right-eye angle of view as the right-eye angle of 3D projection.

\* \* \* \* \*